May 17, 1938.  G. WALTHER  2,117,926
METAL WHEEL
Filed May 10, 1927
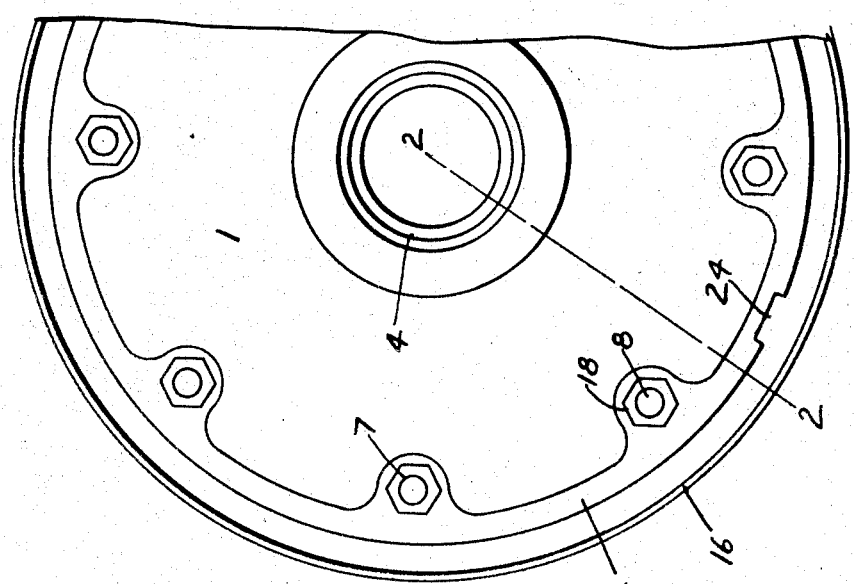
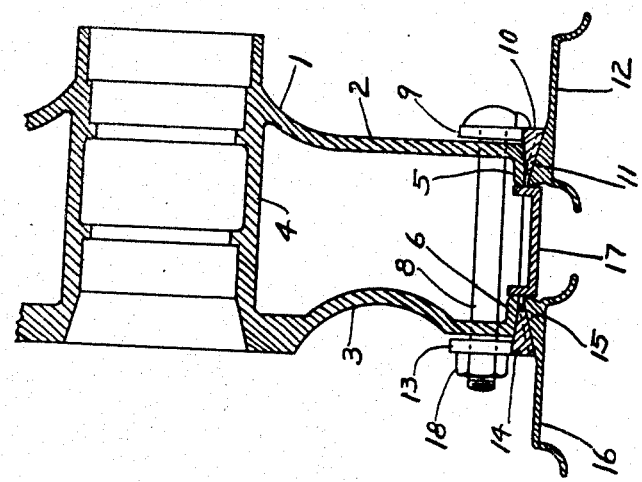
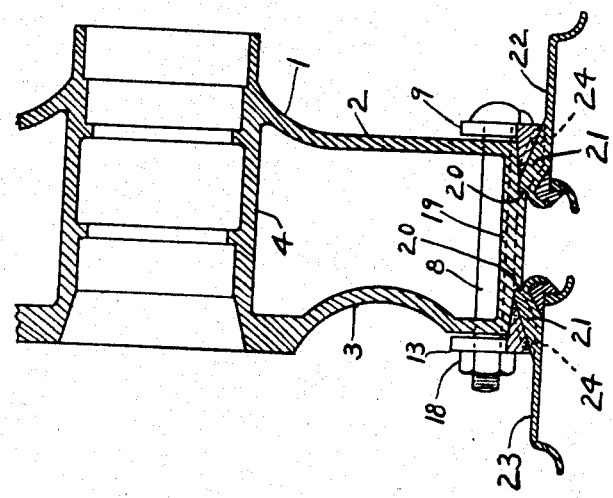
INVENTOR,
George Walther,
BY Howard S. Smith
His ATTORNEY.

Patented May 17, 1938

2,117,926

UNITED STATES PATENT OFFICE 2,117,926

METAL WHEEL

George Walther, near Dayton, Ohio, assignor to The Dayton Steel Foundry Company, a corporation of Ohio Application May 10, 1927, Serial No. 190,195

5 Claims. (Cl. 301—13)

This invention relates to new and useful improvements in metal wheels.

It is the principal object of my invention to provide a dual demountable tire metal wheel in which both tire rims are held tight and in position by spacing means against which pressure is exerted by loose beveled wedge members. Such a structure insures an accurate alinement of the tire rims upon the wheel. The spacing means employed with the beveled wedge members may be separate from, or integral with, the wheel, as desired.

Other important and incidental objects will be brought out in the following specification, and particularly set forth in the sub-joined claims.

In the accompanying drawing illustrating my invention, Figure 1 is a front view of my dual demountable tire wheel. Figure 2 is a cross-sectional view taken through said wheel on the line 2—2 of Figure 1. And Figure 3 is a cross-sectional view taken through such a wheel when the spacing means are integral with it.

Referring to the accompanying drawing for a detailed description of my invention, the numeral 1 designates a metal wheel which is preferably constructed of steel, and having an extended hub portion, such as that provided by the discs 2 and 3, which are integral with its hub part 4. The disc 2 is formed at its outer periphery with an inwardly turned flange seat 5, and the disc 3, which is concave at its middle portion, is formed at its outer periphery with a similar flanged seat 6.

Formed in the side faces of the outer portions of the discs 2 and 3, are oppositely disposed holes 7 that receive bolts 8, one of which is shown in Figure 2. Applied to the head ends of the bolts 8 are angle wedge members 9 whose outer surfaces 10 are beveled for engagement with a beveled portion 11 that is formed off center on a tire rim 12. Applied to the other ends of the bolts 8, are angle wedge members 13, each one of which is formed with a beveled surface 14 that is adapted to engage a beveled portion 15 formed off center on a tire rim 16.

Between the flanged portions 11 and 15 of the tire rims 12 and 16, a spacing member 17 is inserted. As shown in Figure 2, this spacing member 17 is U-shaped in cross section, although it may be of any other suitable form. To the outer threaded ends of the bolts 8, there are applied nuts 18 by which the wedge members 9 and 13 are forced between the seats 5 and 6 and the flanged tire rim portions 11 and 15 respectively to press the tire rims 12 and 16 solidly against the spacing member 17. This spacing member provides a strong abutment for the tire rims, and assists the wedge members 9 and 13 in tightly and accurately holding the tire rims on the wheel. The wedge members 9 and 13 may be continuous or intermittent ones.

In Figure 3 I have shown an integral spacing part 19 formed between the outer portions of the discs 2 and 3. These spacing parts 19 are formed with shoulders 20, 20 that are adapted to be engaged by intermittent beveled portions 21, 21 on tire rims 22 and 23 respectively. (See Figure 3.) In this instance the beveled portions 21 of the tire rims are engaged by the wedge members 9 and 13 to hold the tire rims tightly and accurately upon the wheel against its integral shouldered spacing parts 19.

Carried by the tire rims in both Figures 2 and 3 are driving members 24 which are fitted into slots in the wedge members 9 and 13, as shown by the dotted lines in said figures.

I do not wish to be limited to the details of construction and arrangement herein shown and described, and any changes or modifications may be made therein within the scope of the sub-joined claims.

Having described my invention, I claim:

1. A metal wheel comprising a hub and hub extensions, two tire rim seats on said extensions, a tire rim for each seat, spacing means between said seats, separate wedge members insertible between said seats and the tire rims for pressing the latter solidly against the spacing means, said wedge members formed with slots, and driving members carried by the tire rims and fitted into the slots in said wedge members.

2. A vehicle wheel having inner and outer tire rims thereon, each rim having a single, tapered seating surface at its axially inner edge, unobstructed tapered seats engaged by the tapered surfaces of said rims, square-shouldered central abutments circumferentially spaced and integrally formed with said wheel between said rims, and means on both sides of the wheel clamping said rims against the central abutments, whereby said rims will be supported by their single tapered seats in planes absolutely at right angles to the axis of the wheel.

3. A vehicle wheel having inner and outer tire rims thereon, each rim having a single, tapered seating surface at its axially inner edge, unobstructed tapered seats engaged by the tapered surfaces of said rims, circumferentially spaced, square-shouldered ridges on the wheel between said rims, and individual clamping means on both sides of the wheel forcing said rims against the square shouldered ridges, whereby said rims will be supported by their single tapered seats in planes absolutely at right angles to the axis of the wheel.

4. A vehicle wheel having inner and outer tire rims, an axially projecting circumferential seat on each side of the wheel, each tire rim having a single tapered seating surface at its axially inner edge, circumferentially spaced, square shouldered abutments integral with the wheel between said rims, and wedge clamps on each side of the wheel insertible between the tapered surface of each tire rim and its respective seat for clamping it against the central abutments.

5. A vehicle wheel comprising a hub and two hub extensions, an axially projecting seat on the radially outer end of each hub extension, a tire rim having a tapered axially inner edge mounted on each seat, spacing parts formed between the radially outer ends of said hub extensions, a square-shouldered integral central abutment on each spacing part, and wedge clamps on each side of the wheel engaging the tapered edges of the tire rims to force the latter tightly against the central abutments.

GEORGE WALTHER.